US006564381B1

(12) United States Patent
Hodge et al.

(10) Patent No.: US 6,564,381 B1
(45) Date of Patent: May 13, 2003

(54) AUTOMATIC DIGITAL INFORMATION AND CONTENT SCHEDULING AND BARKERING SYSTEM

(75) Inventors: Winston H. Hodge, Yorba Linda, CA (US); Robert M. Kamm, Danville, CA (US); Lawrence E. Taylor, Anaheim, CA (US); David L. Hench, Orange, CA (US); Pierre A. Schuberth, Corona del Mar, CA (US); Kang Tsi Yam, Corona del Mar, CA (US); Gary B. Seaton, Newport Beach, CA (US)

(73) Assignee: VXL Capitol Partners Corporation, Ltd., Kuala Lumpur (MY)

( * ) Notice: Subject to any disclaimer, the term of this patent is extended or adjusted under 35 U.S.C. 154(b) by 0 days.

(21) Appl. No.: 09/161,324

(22) Filed: Sep. 25, 1998

Related U.S. Application Data

(60) Provisional application No. 60/060,111, filed on Sep. 26, 1997.

(51) Int. Cl.[7] ............................ H04N 7/10; H04N 7/173
(52) U.S. Cl. ......................... 725/97; 725/9; 725/35; 725/45; 725/46
(58) Field of Search ........................... 725/9, 97, 98, 725/87, 35, 45, 46; 705/14

(56) References Cited

U.S. PATENT DOCUMENTS

| | | | | |
|---|---|---|---|---|
| 5,600,364 A | * | 2/1997 | Hendricks et al. | 725/9 |
| 5,734,719 A | * | 3/1998 | Tsevdos et al. | 380/5 |
| 5,758,257 A | * | 5/1998 | Herz et al. | 725/9 |
| 5,798,785 A | * | 8/1998 | Hendricks et al. | 725/9 |
| 5,838,314 A | * | 11/1998 | Neel et al. | 345/327 |
| 5,848,396 A | * | 12/1998 | Gerace | |
| 5,886,995 A | * | 3/1999 | Arsenault et al. | 370/477 |
| 6,005,561 A | * | 12/1999 | Hawkins et al. | 345/327 |
| 6,028,599 A | * | 2/2000 | Yuen et al. | 345/327 |

\* cited by examiner

*Primary Examiner*—Andrew Faile
*Assistant Examiner*—Krista Bui
(74) *Attorney, Agent, or Firm*—Bever, Hoffman & Harms, LLP; James E. Parsons

(57) ABSTRACT

A method and apparatus for scheduling the distribution of information so as to maximize the viewer ship of the same and, therefore, profits. Dynamic scheduling of distribution of subportions of the information, referred to as descriptors that typically correspond to a motion picture program, is achieved so that the subportions may be transmitted to end users having a high probability of perceiving the same. A subgroup of the descriptors have a weighting value assigned thereto with said subgroup of said plurality of descriptors having a weighting value differing from the weighting value associated with the remaining descriptors of said subgroup. The weighting value is a function of predetermined parameters associated with said motion picture program, such as revenue generated when released in movie theaters, comments by professional critics and contractual constraints placed upon the distributor by holders of the ownership rights of the motion picture program. Viewing population numbers are assigned to segments of a predetermined period of time, typically the different hours of the day. The descriptors are then scheduled to be transmitted to end users so that the descriptors with the greatest weighting value is transmitted during a segment which has the greatest viewing population number.

32 Claims, 5 Drawing Sheets

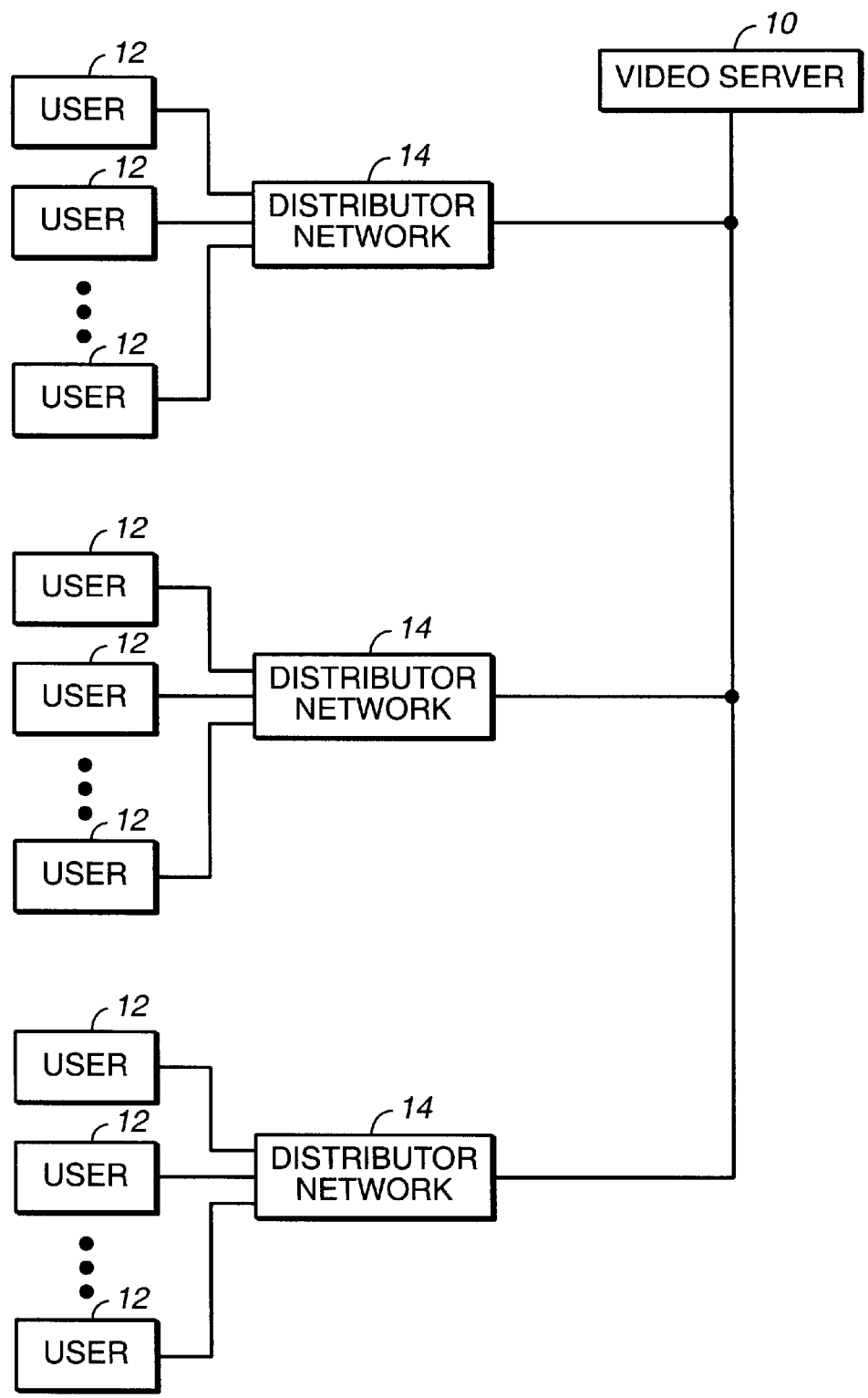
FIG._1

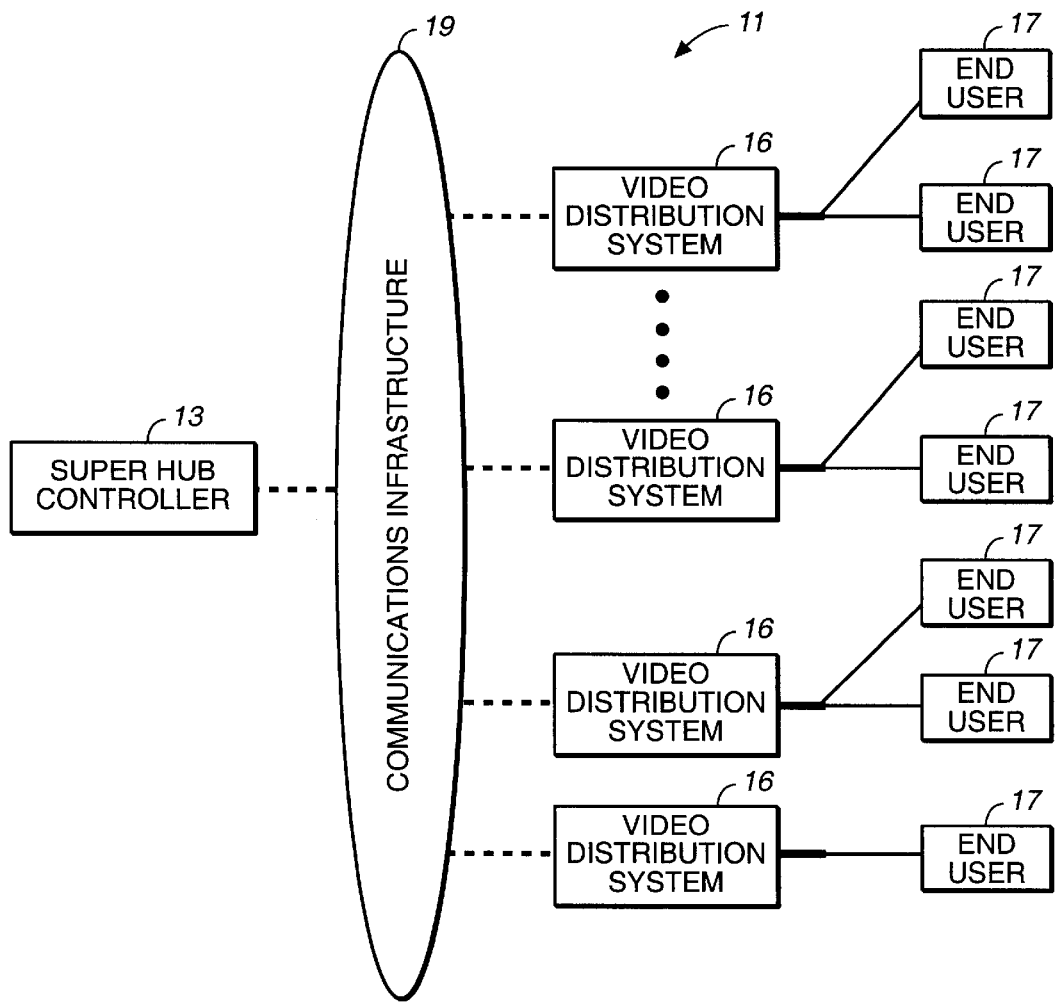
FIG._2

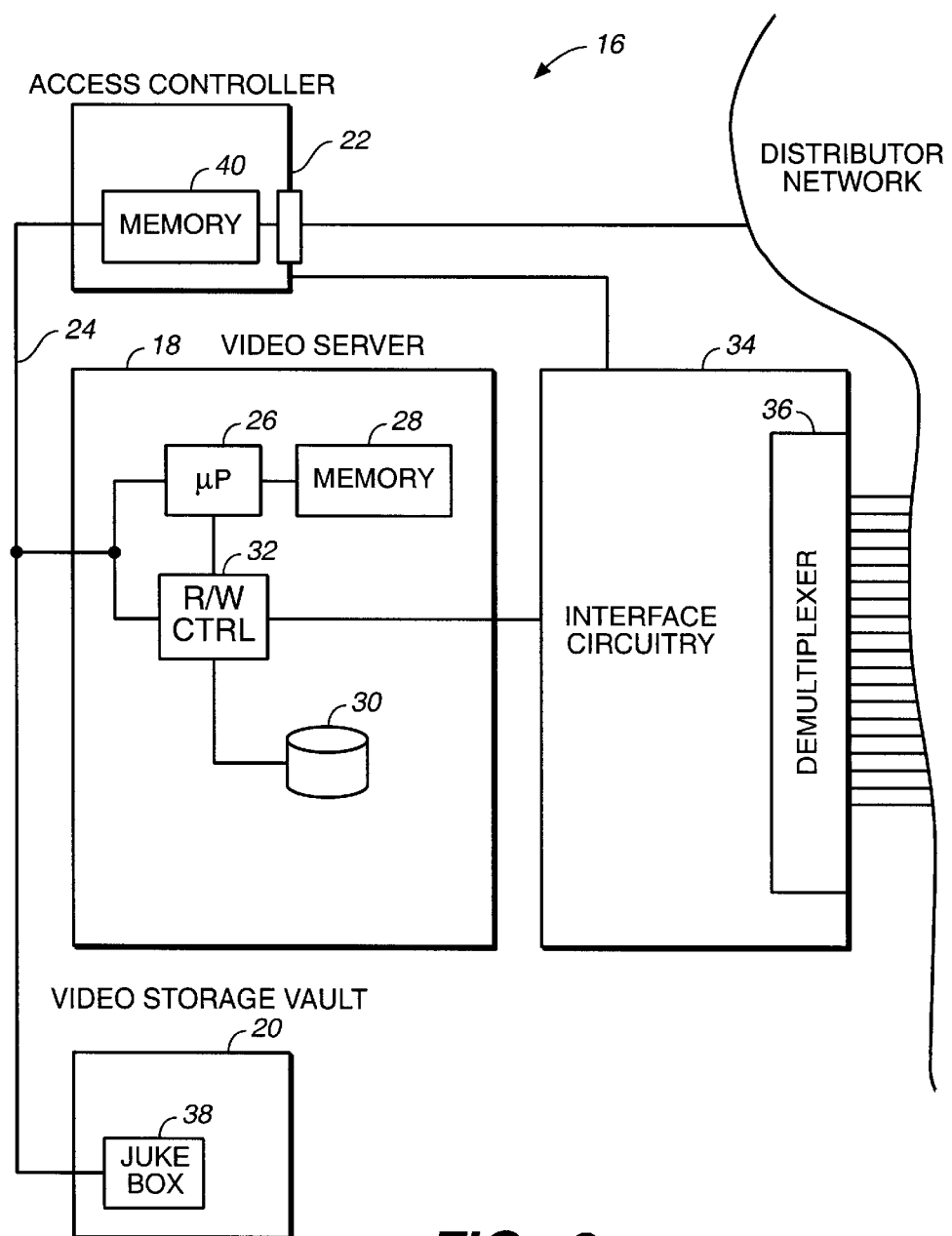
FIG._3

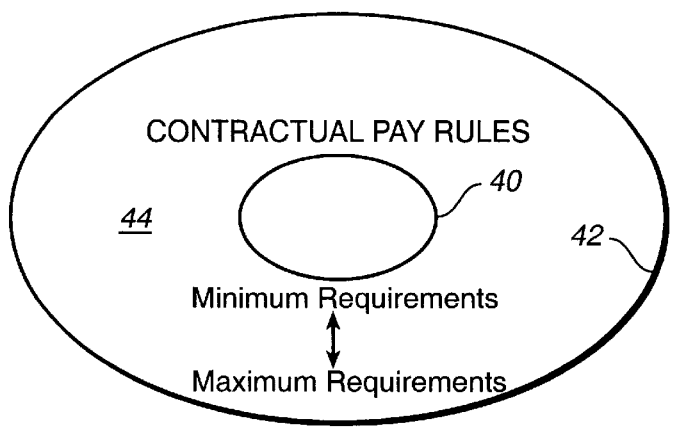
FIG._4
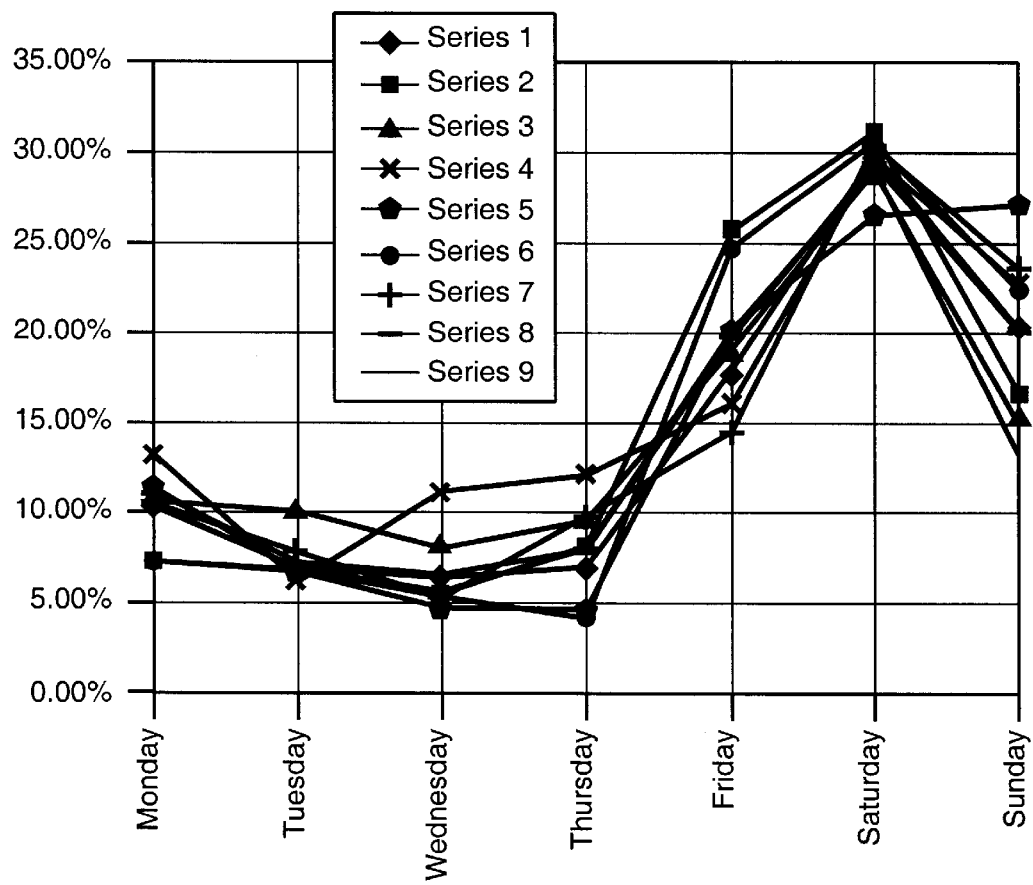
FIG._5

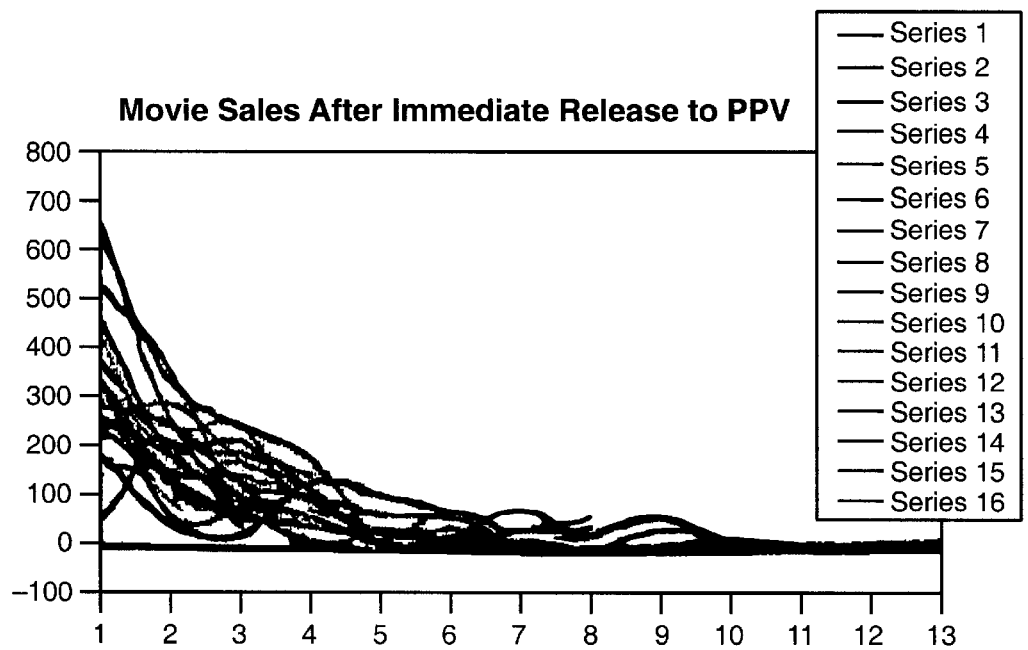
FIG._6
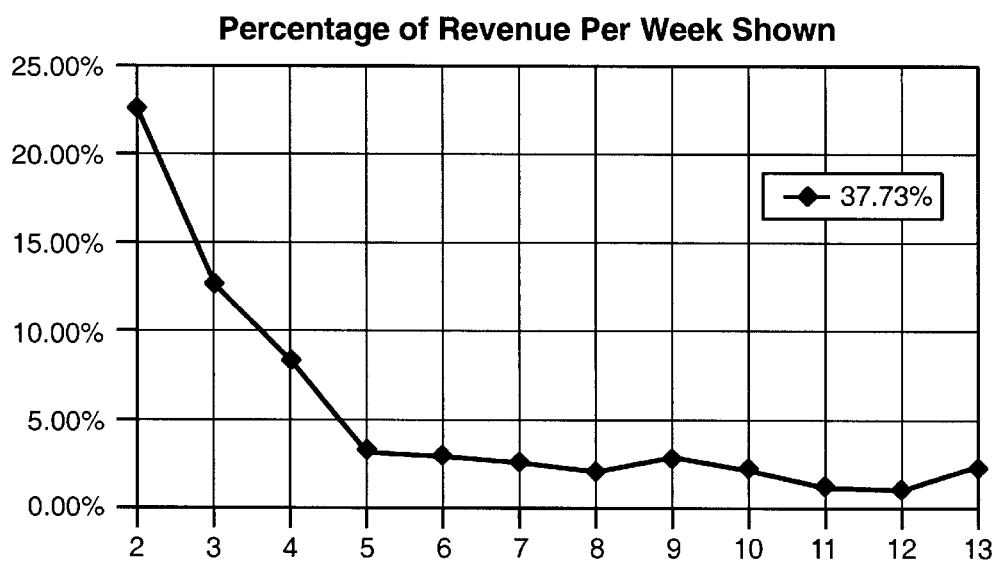
FIG._7

AUTOMATIC DIGITAL INFORMATION AND CONTENT SCHEDULING AND BARKERING SYSTEM

CROSS REFERENCE TO RELATED APPLICATIONS

This application is a nonprovisional application of U.S. provisional patent application "AN AUTOMATIC DIGITAL INFORMATION AND CONTENT SCHEDULING AND BARKERING SYSTEM," U.S. Serial No. 60/060,111, filed Sep. 26, 1997, having Winston W. Hodge, Robert M. Kamm, Lawrence E. Taylor, David L. Hench, Pierre A. Schuberth, Kang T. Yam and Gary B. Seaton listed as co-inventors and assigned to Alpine Microsystems. The No. 60/060,111 application is hereby incorporated by reference in its entirety.

BACKGROUND OF THE INVENTION

The present invention relates to distribution of information either through broadcasting transmission over a local or wide area network, e.g., the Internet, or using cable video systems. More particularly, the invention provides a technique, including a method and apparatus, for scheduling distribution of video/audio information so as to maximize viewer ship of the same and, therefore, profits.

High speed networking and mass storage technologies have made possible interactive communication networks which provide consumers with video/audio information. Broadcast, video-on-demand, pay-per view, cable and Internet services are some of the best known services for providing consumers with programming choices ranging from movies to interactive games. FIG. 1 shows the major components of a video on demand service. The video programs, such as movies, are typically stored in one of various formats at a central server 10. Subscribers 12 submits requests to the server 10 for particular programs over a communications network 14. The communications network 14 may use any transmission medium, e.g. commercial telephone, cable and satellite networks. Upon receiving a request, server 10 retrieves the video program from mass storage and delivers a data stream, corresponding to the frames of the movie, to the requesting subscriber via distribution network 14. The data stream is directed to a receiver possessed by the subscriber which converts the data stream into signals necessary for playback and viewing of the movie.

As the number of providers for each of the aforementioned services increases, the bandwidth of the channels available for distributing information decreases. To that end, the prior art is replete with systems and methods of maximizing the revenue generated by a given bandwidth of transmission channels. For example, U.S. Pat. No. 5,758,257 to Herz et al. and U.S. Pat. No. 5,734,720 to Salganicoff each discloses a system and a method for scheduling receipt of desired movies and other forms of data from a network which simultaneously distributes many sources of such data to many customers, as in a cable television system. Customer profiles are developed for the recipient describing how important certain characteristics of the broadcast video program, movie or other data are to each customer. From these profiles, an "agreement matrix" is calculated by comparing the recipient's profiles to the actual profiles of the characteristics of the available video programs, movies or other data.

U.S. Pat. No. 5,594,491 to Hodge et al., assigned to the assignee of the present invention, discloses a system and method for distributing video over ADSL telephone lines. To maximize usage of the bandwidth provided by a system storing the information to be distributed, Hodge et al. advocate implementing a Near-Video-On Demand (NVOD) protocol. The NVOD protocol maps a video program onto disk-drive in an interleaved fashion so that the video program is divided into data packets having a plurality of frames with each pair of adjacent frames corresponding to a pair of frames in a viewing sequence displaced from one another by a predetermined number of frames. Mapping the video frames in this manner renders the system compatible with existing video distribution systems, while maximizing the number of users that may access any given program.

U.S. Pat. No. 5,172,413 to Bradley et al. describes, in pertinent part, use of a central electronic library to store and deliver high-demand entertainment programming to local community electronic libraries that channel the programming to subscribers. Low-demand programming is stored and delivered directly from a local community electronic library located in an area in which there may be a special interest in the programming. In this manner, Bradley et al. maximize access capacity while minimizing investment cost.

U.S. Pat. No. 5,421,031 to De Bey describes, in pertinent part, a video-on-demand system in which a video program disposed on a non-volatile storage device in divided into a plurality of segments. The segments are transmitted to each subscriber as a redundant sequence. The sequence is transmitted in accordance with a scheduling algorithm that ensures all the video segments of the video program are received by the subscriber to enable continuous playback in real-time of the video program. In this manner, the segments typically correspond to a non-contiguous sequence of video frames. The receiver, possessed by the subscriber, includes a buffer having sufficient memory to store a sufficient amount of video segments to ensure the subscriber experiences real-time playback of the video program.

What is needed, however, is a system and method for transmitting programming material so as to maximize the number of viewers of the same.

SUMMARY OF THE INVENTION

The present invention provides a method and apparatus to schedule the distribution of information so as to maximize the viewer ship of the same and, therefore, profits. This is accomplished by dynamically scheduling distribution of information, segments of which are referred to as descriptors that typically correspond to a motion picture program, to be transmitted to an end user having a high probability of viewing the same. A subgroup of the descriptors have a weighting value assigned thereto with the subgroup of the plurality of descriptors having a weighting value differing from the weighting value associated with the remaining descriptors of the subgroup. The weighting value is a function of predetermined parameters associated with the motion picture program, such as revenue generated when released in movie theaters, comments by professional critics and contractual constraints placed upon the distributor by holders of the ownership rights of the motion picture program. Viewing population numbers are assigned to segments of a predetermined period of time, typically the different hours of the day. The descriptors are then scheduled to be transmitted to end users so that the descriptors with the greatest weighting value is transmitted during a segment which has the greatest viewing population number.

BRIEF DESCRIPTION OF THE DRAWINGS

FIG. 1 is a simplified block diagram of a prior art video-on-demand distribution system;

FIG. 2 is a simplified block diagram of a content and management information controller coupled to a plurality of video distribution systems via a communications infrastructure;

FIG. 3 is a detailed block diagram of a video distribution system shown in FIG. 2;

FIG. 4 is a graphical representation of contractual constraints which are quantified and operated on by the content and management information controller shown in FIG. 2;

FIG. 5 is a graph depicting the purchasing rate per day for a given week;

FIG. 6 is a graph depicting the sales of a movie program compared to the number of weeks the movie program has been released; and FIG. 7 is a graph depicting the average revenue generated by the movie program depicted above in FIG. 6.

DESCRIPTION OF THE PREFERRED EMBODIMENT

Referring to FIG. 2, a content and management information controller (CAMIC) 11 a super hub controller 13 in data communication with one or more video distribution systems 16 (VS) each of which are in data communication with one or more end users 17. The super hub controller 13 may be located proximate to one or more of the distribution systems 16 or may be remotely located with respect thereto. To that end, the super hub controller 13 is typically in data communication with the each of the video distribution systems 16 via an existing communication infrastructure 19, such as the Internet, cable network system, television broadcast network or satellite.

The super hub controller 13 may consist of one or more computers and functions to distribute information to the video distribution systems 16 and control operation of the same, such as content installation, play rule determination, barker channel (advertisements) preparation, accounting, maintenance and the like. Two of the most complicated operations concern content delivery and installation. Specifically, content delivery of any given video program must entertain a plurality of variables to ensure maximum revenue generation by distributing the same. For example, motion picture studios have predetermined requirements that a distributor of a video program must adhere to, such as minimum play times. These motion picture studio requirements are dependent upon many variables such as theater box office receipts, number of viewing times, number of available channels, actual viewing times and the like. The CAMIC 11 is programmed employing standard artificial intelligence and feedback control techniques to facilitate these activities.

In this manner, the CAMIC 11 overcomes many of the difficulties with traditional prior art information distribution systems. Traditionally, video service providers have placed their equipment at cable television and telephone company servers, leaving the operation, management and maintenance to local operators. This required the operators to be responsible for: physical equipment installation & validation; continuing video/multimedia content installation; setting up Barker channel (continuing); setting up Play Rules (continuing); administration of Play Rules (continuing); setting up and maintaining customer data bases (continuing); setting up and maintaining demographic databases; and validating EPG and Billing interfaces. The CAMIC 11 reduces the burden on local operators by providing a centralized automated control of the video servers. As a result, the CAMIC 11 may either supports or replace local operators. This provides added flexibility for information distribution provides by allowing local operators to override the control parameters provided by the CAMIC 11. Alternatively, the control parameters may be treated as suggestions to simplify the local end operator's system management duties.

The system described will interface with either external or internal Electronic Program Guides (EPGs) and Customer Billing Systems and provide remote or local control of CATV or TELCO Resources at one or many CATV or TELCO Head Ends. With the CAMIC 11, rapid deployment of operational units to CATV and TELCO head ends may be achieved while minimizing the need for large human organizational support to operate PPV VOD ITV business.

FIG. 3 shows a typical video distribution system 16 with which the present invention may be incorporated. System 16 includes a video server 18, video storage vault 20 and an access controller 22. Video server 18, video storage vault 20 and access controller 22 are in data communication via line 24. Video server 18 includes a microprocessor 26 which may be incorporated into a personal computer such as a PENTIUM or Motorola 68000 processor. The microprocessor 26 is associated with a memory 28. Microprocessor 26 is in data communication with one or more disk-drives 30 via a disk read write controller 32, with each controller 32 uniquely associated with a disk-drive 30. Although any type of disk drive may be employed, preferably disk drives 30 are single large disk capable of handling at least one video program of 100 minutes in duration. Data from the disk-drive 30 is distributed by network interface circuitry 34 which is in data communication therewith. Interface circuitry 34 includes a multiplexor 36 which distributes data to the requesting subscribers (not shown). Each subscriber typically includes a receiver (not shown) having the circuitry necessary to convert data received from the video server 18 into viewable material.

Video storage vault 20 includes a bulk video storage system such as video juke box 38. Juke box 38 may comprise of high capacity disks or tapes storing thousands of video programs in encoded, compressed and digitized form. A typical 100 minute movie of VHS quality requires one Gigabyte of storage. However, the amount of storage capacity for a given frame of a movie is dependent upon the quality of the movie. For example, a 100 minute HDTV video requires more the one Gigabyte of storage.

Access controller 22 is in data communication with a memory 40 which typically includes a database identifying authorized subscribers. The interface circuitry 34 is in data communication with the access controller 22 so that access to system 16 by a particular subscriber is restricted unless memory 40 indicates access is authorized. If access is authorized, access controller 22 allows interface circuit to distribute the video programs to the subscriber. Otherwise, access controller 22 denies the subscriber access to data on the system 16. To maximize the number of users that may access a video program on any given disk-drive 30, the frames of each video program is mapped thereon in an interleaved fashion. The mapping of the video program on each of disk-drives 30 may be performed prior to a subscriber request, or may be done during a period in which a video program is transferred from the storage vault 20 to the disk-drives 30, in response to a subscriber's request.

Although the CAMIC 11 may be employed with any type information distribution system, the description contained here will describe implementation of the CAMIC 11 with a pay-per-view(PPV)/video-on-demand (VOD) system. In this implementation, the CAMIC 11 facilitates dynamic content scheduling to optimize revenue generation, as well as barker channel programming. For example, the motion picture studios have constraints (motion play rules MPR) that must be adhered to by distributors of movie programs. A typical MPR requires that movie programs having the greatest revenue in movie theaters be provided a greater percentage of the bandwidth of the video distribution system 16, than the remaining movies being shown, i.e., movies generating lower revenues in movie theaters. Typically, the movies having lower revenues associated therewith are allocated a minimum amount of bandwidth.

Referring to FIGS. 2 and 4, the contractual constraints presented by MPRs may be envisioned as containing minimum values 40 and maximum values 42. The area 44 between the minimum 40 and maximum 42 values represents operational latitude for operators. The CAMIC 11 is designed to optimize revenue generation while maintaining operational head end profits while operating within the operational latitude area 44. This is achieved by dynamically adjusting the scheduling of programming material on the video distribution systems 16 so that, for example, the most profitable films are shown at during a segment of time when the largest view audience is available to perceive the programming information. Conversely, the least profitable movie programs are shown when the fewest numbers of viewer are available, while adhering to the MPRs. Further optimization on limited video distribution systems may be provided by randomizing different events according to a system of "play rules", as discussed more fully below.

These play rules are evaluated and ranked. There exists one individual play rule value for each movie program or other information to be distributed. These individual Play Rule Values (PRVs) are then ranked and associated with viewing times which are also ranked from minimum to maximum values corresponding to minimum and maximum viewing audiences, respectfully.

The pairing of movies/events with viewing times provides a viewing schedule which can be optimized for expected profitability. Since it is expected that Play Rule Values will change from day to day and week to week, the measurement of Pay Per View (PPV) sales is one of many feedback parameters which will permit parameter optimization, as well as predicted revenue generation by examining the historic revenue generated by theater box office sales. Also, success might be determined by professional critique of the video program material by critics.

Shown below is a sample of movie sales for a period of time. It would be possible to normalize this example in a potential success range with a single value for each movie program from one to ten. This would become an element of the group of parameters making up the Program Rule Values.

TABLE 1

HISTORICAL BOX OFFICE SALES

| VARIETY BOX OFFICE | World Wide Sales | VARIETY BOX OFFICE | World Wide Sales |
| --- | --- | --- | --- |
| Star Wars (reissue) ™ | $645,974,423 | Fools Rush In (Sony) ™ | $25,526,308 |
| Empire Strikes Back (reissue) ™ | $459,456,515 | Breaking the Waves (October/ . . .) ™ | $21,502,218 |
| Ransom (BV) ™ | $293,841,038 | Private Parts (Par) ™ | $18,906,599 |
| 101 Dalmatians (BV) ™ | $218,369,398 | Mother (Par) ™ | $18,510,792 |
| Space Jam (WB) ™ | $185,699,050 | Ridicule (CFP/Miramax) ™ | $18,192,910 |
| Jerry Maguire (Sony) ™ | $168,380,416 | In Love and War (New Line) ™ | $17,148,061 |
| Star Trek: First Contact (Par) ™ | $141,337,397 | Jungle 2 Jungle (BV) ™ | $16,270,074 |
| Evita (BV) ™ | $132,009,270 | That Darn Cat (BV) ™ | $15,961,024 |
| Michael (New Line) ™ | $101,937,698 | Booty Call (Sony) ™ | $14,940,756 |
| Scream (Miramax) ™ | $90,178,159 | Turbulence (MGM) ™ | $14,806,390 |
| English Patient (Miramax) ™ | $70,863,872 | Marvin's Room (Miramax) ™ | $14,628,339 |
| Mars Attacks (WB) ™ | $68,407,743 | Ghosts of Mississippi (Sony) ™ | $13,014,690 |
| Dante's Peak (U) ™ | $60,618,907 | Across the Sea of Time (Sony) ™ | $12,271,123 |
| One Fine Day (20th) ™ | $56,730,819 | Beautician and the Beast (Par) ™ | $10,748,798 |
| Shine (New Line) ™ | $55,863,536 | Rosewood (WB) ™ | $10,431,502 |
| The Preacher's Wife (BV) ™ | $54,210,740 | Smilla's Sense of Snow (Fox) ™ | $7,967,034 |
| Secrets & Lies (October/Alliance) ™ | $46,736,377 | Zeus and Roxanne (MGM) ™ | $7,098,097 |
| Absolute Power (Sony) ™ | $43,140,900 | Lost Highway (October/Malo . . .) ™ | $6,269,969 |
| Metro (BV) ™ | $35,767,377 | Gridlock'd (Gramercy) ™ | $5,552,507 |
| The Relic (Par) ™ | $35,023,090 | Sling Blade (Miramax) ™ | $5,358,210 |
| Vegas Vacation (WB) ™ | $31,328,556 | Dangerous Ground (New Line) ™ | $5,102,151 |
| Beverly Hills Ninja (Sony) ™ | $29,455,486 | Hamlet (Sony) ™ | $4,149,241 |
| Donnie Brasco (Sony) ™ | $25,856,141 | Meet Wally Sparks (Trimark) ™ | $4,073,582 |
| Fools Rush In (Sony) ™ | $25,526,308 | The Pest (Sony) ™ | $3,407,993 |
| My Fellow Americans (WB) ™ | $22,240,513 | | |

Some (but not all) of the elements of the Program Rule Values are: pending real time events, theater box office sales, number of available digital channels, demographic factors, content purchased locally, time of day, day of week, local operator preferences, holidays, time since last play, program duration, avail window and duration, film critics' ratings, and automatically adapting weights for each of these parameters. From these parameters, an electronic spread sheet (matrix) is assembled, shown in Table 2, which automatically computes the PRV for each movie or event. The events are then sorted according to their Play Rule Value which has been scaled in a range from 1 to 10 where 10 is best.

TABLE 2

MOVIE RANKING, INDEPENDENT OF DAY OR TIME

| Movie Product Name | Minimum Studio Contractual Requirements | Weighting Values | Maximum Studio Contractual Requirements | Weighting Value | Real Time Events | Weighting Value | Theater Gross Sales "O" in $Millions | Weighting Value |
|---|---|---|---|---|---|---|---|---|
| When a Man Loves a Woman | 803 | 9 | 857 | 5 | 0 | 9 | 50 | 9 |
| Beverly Hills Cop | 501 | 9 | 819 | 5 | 0 | 9 | 42 | 9 |
| I Love Trouble | 708 | 9 | 508 | 5 | 0 | 9 | 31 | 9 |
| Getting Even With Dad | 772 | 9 | 813 | 5 | 0 | 9 | 10 | 9 |
| Jurassic Park | 854 | 9 | 735 | 5 | 0 | 9 | 358 | 9 |
| Speed | 696 | 9 | 538 | 5 | 0 | 9 | 121 | 9 |
| True Lies | 505 | 9 | 719 | 5 | 0 | 9 | 145 | 9 |
| The Flinstones | 907 | 9 | 858 | 5 | 0 | 9 | 130 | 9 |
| The Client | 843 | 9 | 859 | 5 | 0 | 9 | 92 | 9 |
| Clear and Present Danger | 678 | 9 | 628 | 5 | 0 | 9 | 121 | 9 |
| The Mask | 535 | 9 | 531 | 5 | 0 | 9 | 118 | 9 |
| Natural Born Killers | 711 | 9 | 821 | 5 | 0 | 9 | 60 | 9 |
| Stargate | 888 | 9 | 333 | 5 | 0 | 9 | 71 | 9 |
| Boxing | 999 | 9 | 888 | 5 | 0 | 9 | 235 | 9 |

| Movie Product Name | Number of Available Digits(s) Channels "C" | Weighting Value | Scaling Vectors "R" | Weighting Value | Local Demographics "S" | Weighting Value | Local Contrast Purchases "P" | Weighting Value | Time "T" |
|---|---|---|---|---|---|---|---|---|---|
| When a Man Loves a Woman | 674 | 3 | 945 | 3 | 854 | 3 | 616 | 6 | 626 |
| Beverly Hills Cop | 795 | 3 | 793 | 3 | 624 | 3 | 880 | 6 | 512 |
| I Love Trouble | 759 | 3 | 538 | 3 | 508 | 3 | 653 | 6 | 713 |
| Getting Even With Dad | 794 | 3 | 558 | 3 | 832 | 3 | 674 | 6 | 652 |
| Jurassic Park | 782 | 3 | 801 | 3 | 809 | 3 | 577 | 6 | 706 |
| Speed | 585 | 3 | 830 | 3 | 408 | 3 | 484 | 6 | 754 |
| True Lies | 812 | 3 | 801 | 3 | 889 | 3 | 804 | 6 | 870 |
| The Flinstones | 765 | 3 | 534 | 3 | 853 | 3 | 610 | 6 | 444 |
| The Client | 476 | 3 | 852 | 3 | 620 | 3 | 900 | 6 | 677 |
| Clear and Present Danger | 967 | 3 | 612 | 3 | 675 | 3 | 887 | 8 | 648 |
| The Mask | 737 | 3 | 805 | 3 | 776 | 3 | 855 | 6 | 752 |
| Natural Born Killers | 644 | 3 | 687 | 3 | 649 | 3 | 613 | 6 | 508 |
| Stargate | 585 | 3 | 830 | 3 | 409 | 3 | 484 | 6 | 740 |
| Boxing | 987 | 3 | 612 | 3 | 675 | 3 | 687 | 6 | 492 |

| Movie Product Name | Weighting Value | Date "d" | Weighting Value | Day "n" | Weighting Value | Holiday "h" | Weighting Value | Local Operator Preferences "p" |
|---|---|---|---|---|---|---|---|---|
| When a Man Loves a Woman | 5 | 738 | 2 | 490 | 7 | 457 | 2 | 474 |
| Beverly Hills Cop | 4 | 676 | 6 | 745 | 6 | 611 | 3 | 588 |
| I Love Trouble | 5 | 778 | 5 | 768 | 3 | 755 | 3 | 704 |
| Getting Even With Dad | 7 | 662 | 3 | 646 | 3 | 600 | 8 | 516 |
| Jurassic Park | 3 | 523 | 5 | 818 | 8 | 542 | 7 | 907 |
| Speed | 8 | 448 | 2 | 741 | 5 | 881 | 4 | 513 |
| True Lies | 5 | 695 | 5 | 473 | 4 | 557 | 3 | 543 |
| The Flinstones | 8 | 583 | 3 | 528 | 7 | 503 | 5 | 590 |
| The Client | 2 | 633 | 3 | 811 | 4 | 797 | 8 | 817 |
| Clear and Present Danger | 5 | 622 | 5 | 825 | 4 | 517 | 7 | 844 |
| The Mask | 2 | 459 | 4 | 483 | 5 | 824 | 2 | 817 |
| Natural Born Killers | 7 | 534 | 8 | 520 | 5 | 622 | 4 | 682 |
| Stargate | 4 | 867 | 8 | 612 | 5 | 575 | 4 | 567 |
| Boxing | 4 | 585 | 8 | 830 | 5 | 409 | 6 | 484 |

TABLE 2-continued

MOVIE RANKING, INDEPENDENT OF DAY OR TIME

| Movie Product Name | Weighting Value | Time Since Last Playing | Weighting Value | Program Duration | Weighting Value | Cisco & Ebert Rating | Weighting Value | Rounded Rank | Scaled Rank |
|---|---|---|---|---|---|---|---|---|---|
| When a Man Loves a Woman | 6 | 843 | 6 | 709 | 3 | 663 | 1 | 41283 | 72 |
| Beverly Hills Cop | 5 | 731 | 8 | 818 | 3 | 787 | 1 | 44804 | 75 |
| I Love Trouble | 5 | 688 | 4 | 924 | 6 | 918 | 1 | 43994 | 77 |
| Getting Even With Dad | 7 | 855 | 5 | 430 | 4 | 668 | 1 | 45935 | 80 |
| Jurassic Park | 7 | 782 | 8 | 828 | 5 | 880 | 1 | 57143 | 100 |
| Speed | 4 | 514 | 5 | 501 | 2 | 538 | 1 | 40711 | 75 |
| True Lies | 1 | 717 | 8 | 814 | 7 | 873 | 1 | 45682 | 84 |
| The Flinstones | 7 | 818 | 4 | 465 | 4 | 664 | 1 | 44824 | 82 |
| The Client | 4 | 814 | 5 | 791 | 2 | 839 | 1 | 43746 | 80 |
| Clear and Present Danger | 5 | 513 | 4 | 789 | 7 | 678 | 1 | 45985 | 84 |
| The Mask | 8 | 663 | 2 | 754 | 8 | 614 | 1 | 40227 | 74 |
| Natural Born Killers | 5 | 437 | 3 | 809 | 2 | 778 | 1 | 39650 | 73 |
| Stargate | 4 | 492 | 4 | 585 | 8 | 830 | 5 | 45838 | 84 |
| Boxing | 5 | 740 | 4 | 967 | 5 | 612 | 5 | 54643 | 100 |

In a similar manner, optimum time analysis is developed, and best times by half hour, day and holiday proximity is created and similarly ranked. A mathematical procedure then mates best time with best movie/event ranks, followed by a modest randomizing procedure which reduces distribution of redundant information from occurring thus providing the ability to insert infrequently at optimum times less than optimum content in order to meet contractual play rule requirements.

Inputs to the system for optimum viewing days are based on previous movie sales. The system extrapolates from previous PPV sales and predicts best and worst times for new viewing. This data is available from the system's PPV sales data base.

FIG. 5 depicts best viewing days based upon actual sampled PPV buy rate data from the CAMIC 11. The higher the value, the better the day. Series 1 through 9 are selected movies. It can be observed that typically, the best PPV days are Friday, Saturday and Sunday. Specifically, Friday gets about 20% of the viewing traffic, Saturday gets 27% and Sunday gets about 20% of the total weekly viewing traffic. From this data the CAMIC 11 may determine the most profitable play schedules.

Further analysis of twenty-one top movies have demonstrated more complex but similar relationships. The analysis of these movies has been simplified to represent the minimum and maximum boundaries for the same 7 day integrated viewing period and the mean values (arithmetic and geometric). Both the arithmetic and mean values have very similar values indicating that the randomly selected 21 sample movies do not have highly variant buy characteristics, thereby facilitating the predictability of viewer ship by days. Similar analyses can be extrapolated for time of day viewing. As shown, two different samples from two different databases produced similar day of week viewing merit values. These values are represented in the Table 3 below as samples A and B and illustrate their very small differences.

TABLE 3

Daily Buy Rates from Two Different Movie Databases

| | Sample A | Sample B | Difference |
|---|---|---|---|
| Sunday | 20% | 18% | 3% |
| Monday | 10% | 9% | 2% |
| Tuesday | 7% | 7% | 0% |
| Wednesday | 6% | 8% | -2% |
| Thursday | 8% | 9% | -2% |
| Friday | 19% | 20% | -1% |
| Saturday | 30% | 29% | 1% |
| | 100% | 100% | 0% |

The third column represents the high correlations between databases.

Time of day viewing merit can be ranked simply into a 3 point scale as shown in Table 4 below. The CAMIC 11 will refine these merit values based upon system feedback: however, these initial estimates provide a good starting point for the time of day merit assessment. The three point scale could be expanded for greater resolution, but this probably isn't necessary for good system operation.

TABLE 4

Figures of Merit Based on Time of Day

| | AM | | | | | | | | | | | PM | 1 | 2 | 3 | 4 | 5 | 6 | 7 | 8 | 9 | 10 | 11 | 12 |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| hour value merit | 1 | 1 | 1 | 1 | 1 | 1 | 2 | 2 | 2 | 2 | 2 | 2 | 2 | 2 | 2 | 2 | 2 | 2 | 3 | 3 | 3 | 3 | 3 | 2 |
| Poor = | 1 | | | | | | | | | | | | | | | | | | | | | | | |
| OK = | 2 | | | | | | | | | | | | | | | | | | | | | | | |
| Good = | 3 | | | | | | | | | | | | | | | | | | | | | | | |

When the probabilities of the day of week viewing are applied to the hour of day ranking, the ranking table shown in Table 5 is produced. These hour of week rankings can be sorted and used to meet the requirements which are correspondingly ranked with Movie Play Rule Values. Application of the day of week merit values to the hour of day merit values produces a value of hour per week which can be ranked and matched with movie Play Rule Values; or the process may be extended to determine merit of hours per year. A chart could be produced similar to that depicting weighted merit values of hours per week.

TABLE 5

Figures of Merit Based on Hour and Day of Week
Weighted Hour Per Week Merit Values

| 24 hour time | 1 | 2 | 3 | 4 | 5 | 6 | 7 | 8 | 9 | 10 | 11 | 12 |
|---|---|---|---|---|---|---|---|---|---|---|---|---|
| 12 hour time | 1 | 2 | 3 | 4 | 5 | 6 | 7 | 8 | 9 | 10 | 11 | 12 |
| Sunday | 20% | 20% | 26% | 20% | 20% | 20% | 41% | 41% | 41% | 41% | 41% | 41% |
| Monday | 10% | 10% | 10% | 10% | 10% | 10% | 20% | 20% | 20% | 20% | 20% | 20% |
| Tuesday | 7% | 7% | 7% | 7% | 7% | 7% | 15% | 15% | 15% | 15% | 15% | 15% |
| Wednesday | 6% | 6% | 6% | 6% | 6% | 6% | 11% | 11% | 11% | 11% | 11% | 11% |
| Thursday | 8% | 8% | 8% | 8% | 8% | 8% | 15% | 15% | 15% | 15% | 15% | 15% |
| Friday | 19% | 19% | 19% | 16% | 19% | 19% | 38% | 38% | 38% | 38% | 38% | 38% |
| Saturday | 30% | 30% | 30% | 30% | 30% | 30% | 60% | 60% | 60% | 60% | 60% | 60% |
| 24 hour time | 13 | 14 | 15 | 16 | 17 | 18 | 19 | 20 | 21 | 22 | 23 | 24 |
| 12 hour time | 1 | 2 | 3 | 4 | 5 | 6 | 7 | 8 | 9 | 10 | 11 | 12 |
| Sunday | 41% | 41% | 41% | 41% | 41% | 41% | 61% | 61% | 61% | 61% | 61% | 41% |
| Monday | 20% | 20% | 20% | 20% | 20% | 20% | 31% | 31% | 31% | 31% | 31% | 20% |
| Tuesday | 15% | 15% | 15% | 15% | 15% | 15% | 22% | 22% | 22% | 22% | 22% | 15% |
| Wednesday | 11% | 11% | 11% | 11% | 11% | 11% | 17% | 17% | 17% | 17% | 17% | 11% |
| Thursday | 15% | 15% | 15% | 15% | 15% | 15% | 23% | 23% | 23% | 23% | 23% | 15% |
| Friday | 38% | 38% | 38% | 38% | 38% | 38% | 57% | 57% | 57% | 57% | 57% | 38% |
| Saturday | 60% | 60% | 60% | 60% | 60% | 60% | 89% | 89% | 89% | 89% | 89% | 60% |

Referring to FIG. 6, an additional parameter in the Play Rule Value computation is the method to process the data accumulated by the CAMIC 11 sorting specific movie attendance by number of views since release to PPV. It has long been appreciated that movies shown numerous times attract fewer audiences as the time from introduction is elongated. Most movie viewers like to see the movie as soon after release as possible. Statistical analysis of real data have demonstrated this to be the case. The CAMIC 11 continually collects viewing statistics, and processes them many ways as previously demonstrated. Actual data for 30 movies for a period of 13 weeks. FIG. 7 represents the averages for those same movies. This elementary data is then used to predict optimum play rule values in the future.

The evolving (adapting) numbers shown in FIG. 7 are used to predict movie viewing for new releases. The CAMIC 11 learns from old data how to predict new play rule values. When the some of the play rule values suggest heavy positive weighting for a movie, the fact that it has been showing for 3 weeks is an indicator that the play rule value should be attenuated to some extent. The multiplicative weights for this element of this play rule contributing value are automatically adjusted over time using standard feedback techniques.

Therefore, based upon the Expected Movie Sales as a function of time, the CAMIC 11 normalizes the above graphed values to 1 shown in FIG. 6 and then subtracts from the maximum Play Rule Value a value relating to the descending numbers in the graph in FIG. 7. The de-emphasis value of this element can be seen to drop by about 50% per week until week 5 after which it slowly converges on zero. Optimum content scheduling occurs when the highest ranking content is matched to the highest ranking hours of the week (or year). This is done by sorting content with descending PRVs to hours with descending viewing probabilities, shown in FIG. 8.

An additional benefit with providing CAMIC 11 is that the scheduling of commercial programming, i.e., barkering channels, may be optimized to maximize the association of the commercial programming with the product, e.g., movie program, being advertised. For example, if several movies are starting at the same time soon, it may be desirable to present the Barker for the movie with the highest play rule value immediately prior to the movie preceded by the Barker for the movie with the next highest play rule value, and so forth.

Play Rule Values (PRVs) for either a movie or a barker channel programming are computed from a table driven algorithm as follows:

$$PRV = V \left\{ Cmin < \sum_{i=1}^{m} PRV = f(D, C, K, S, P, t, d, n, h, p)/N < Cmax \right\}$$

Where "N" is a normalizing factor by which PRV is normalized in a range from 1 to 10, with 10 representing the movie with maximum plays and 1 representing movies with minimum plays and "m" is number of movies Cmin and Cmax represent motion picture studios contractual requirements, D represents theater gross sales, C represents number of available digital channels, i.e., bandwidth; K represents scaling factors; S represents local geographic parameters, e.g., weather conditions; P represents, local demographic parameters, e.g., the type of programming material typically purchased; t represents time of day; d represents the date of a calendar year; n represents either the day of a week or of a year; h represents a holiday; p represents local operator preferences or time since programming material was distributed.

The PRV parameters represent a table from which the PRV values are computed. The table is then sorted according to PRV and the one to ten value directs the systems' presentation sequence. The PRV value is within the studio contract ranges between Cmin and Cmax.

The Barker algorithm employs the PRV as an entry in its table to schedule the type of trailers and the time the trailers are to be shown. The barker channel may have 2 or more hours of clips ranging from a few seconds to a few minutes, describing upcoming recorded or real time attractions.

Part of the barker table is a listing of at what times the movies and other content plays. This table is a logical table, and is used to determine which barker clips should play and when, on a dynamic basis. Further, there will be at least one Barker trailer for each movie or other event, but there will likely be 3 Barker trailers for each event: one long trailer, one medium trailer and one short trailer. These different length trailers will be used to maximum advantage. For example, when 4 movies are about to start in a very short time, it will be applicable to use short trailers. When movies are 30 to 60 minutes from starting, the longer trailers can be employed.

The Barker scheduling process will read the Program Schedule to determine placement of the "call to action" trailers. It will also note the next scheduled start time of the feature to which each trailer refers. This information could be used to generate a caption overlay to act as a countdown clock.

The subsequent table illustrates how 30 second and 1 minute trailers could be assembled together in real time to provide content with a high PRV with a higher advertising rate than content with a low PRV.

What is claimed is:

1. A method of dynamically scheduling distribution of information, said method comprising steps of:
    creating a plurality of descriptors, each of which corresponds to a subportion of said information;
    assigning a weighting value to a subgroup of said plurality of descriptors, with said subgroup of said plurality of descriptors having a weighting value differing from the weighting value associated with the remaining descriptors of said subgroup;
    assigning a plurality of viewing population numbers to a predetermined period of time with each of said plurality of viewing population numbers corresponding to a segment of said period; and
    scheduling said descriptors of said subgroup for transmission so that the descriptor of said subgroup having a greatest weighting value, defining a primary descriptor, is transmitted during the segment having a greatest viewing population number associated therewith.

2. The method as recited in claim 1 further including a step of distributing said primary descriptor to an end user.

3. The method as recited in claim 1 wherein said scheduling step includes scheduling each of said descriptor of said subgroup to be transmitted during a plurality of segments, and further including a step of varying said weighting value associated with one of said descriptors of said subgroup so as to be inversely proportional to a quantity of segments during which said one of said descriptors is transmitted.

4. The method as recited in claim 1 wherein said descriptors subportion of information includes a motion picture program having video and audio information associated therewith, with said scheduling step includes scheduling each of said descriptors of said subgroup to be transmitted during a plurality of segments, and further including a step of varying said weighting value as a function of predetermined parameters associated with said motion picture program.

5. The method as recited in claim 4 wherein said parameters include revenue generated by said motion picture program.

6. The method as recited in claim 4 wherein said parameters include historical sales figures for said motion picture program.

7. The method as recited in claim 1 wherein said scheduling step includes scheduling said descriptors of said subgroup for transmission to a plurality of groups of end users, with one said groups having a differing viewing population number for a given segment which differs from the viewing population number associated with the remaining groups, so that the primary descriptor is transmitted to one of said groups during a peak segment associated therewith, said viewing population number associated with any one of said groups being dependent upon profiles of the users associated therewith.

8. The method as recited in claim 7 wherein said profiles includes data concerning weather conditions in the area in which users associated with said profiles are located.

9. The method as recited in claim 7 wherein said profiles includes data concerning socioeconomic status of users.

10. The method as recited in claim 1 wherein said period of time consists of a twenty four hour day and said segments consist of hours.

11. A method of dynamically scheduling distribution of information said method comprising steps of:
    creating a plurality of descriptors, each of which corresponds to a subportion of said information;
    assigning a weighting value to a subgroup of said plurality of descriptors, with said subgroup of said plurality of descriptors having a weighting value differing from the weighting value associated with the remaining descriptors of said subgroup, with said subportion of information including a motion picture program having video and audio information associated therewith, with said weighting value being a function of predetermined parameters associated with said motion picture program, said parameters including revenue previously generated by said motion picture program.
    assigning a plurality of viewing population numbers to a predetermined period of time with each of said plurality of viewing population numbers corresponding to a segment of said period; and
    scheduling said descriptors of said subgroup for transmission to a plurality of groups of end users, with one said groups having a differing viewing population number for a given segment which differs from the viewing population number associated with the remaining groups so that the descriptor of said subgroup having a greatest weighting value, defining a primary descriptor, is transmitted to one of said plurality of groups during the segment, associated with said one of said plurality of groups, having a greatest viewing population number associated therewith, said viewing population number associated with any one of said groups being dependent upon profiles of the users associated therewith.

12. The method as recited in claim 11 further including a step of distributing said primary descriptor to an end user.

13. The method as recited in claim 11 further including a step of selectively varying said weighting factors associated with said descriptors.

14. The method as recited in claim 11 wherein said profiles includes data concerning weather conditions in the area in which users associated with said profiles are located.

15. The method as recited in claim 11 wherein said profiles includes data concerning socio-economic status of users.

16. A system for dynamically scheduling distribution of information, said system comprising:

a server for storing said information as a plurality of descriptors, with each of said plurality of descriptors being associated with a subportion of said information;

a first memory to store code to assign a weighting value to a subgroup of said plurality of descriptors, with said weighting value being a function of predetermined parameters associated with said motion picture program, with said parameters including revenue previously generated by said descriptors;

a second memory to store code to assign a plurality of viewing population numbers to a predetermined period of time with each of said plurality of viewing population numbers corresponding to a segment of said period;

a microprocessor in communication with said first and second memories to operate on the code contained therein to schedule said descriptors of said subgroup for transmission to a plurality of groups of end users, with one said groups having a differing viewing population number for a given segment which differs from the viewing population number associated with the remaining groups so that the descriptor of said subgroup having a greatest weighting value, defining a primary descriptor, is transmitted to one of said plurality of groups during the segment, associated with said one of said plurality of groups, having a greatest viewing population number associated therewith, said viewing population number associated with any one of said groups being dependent upon profiles of the users associated therewith.

17. The system as recited in claim 16 wherein said server is a video-on-demand server.

18. The system as recited in claim 16 wherein said server is a near-video-on-demand server.

19. The system as recited in claim 16 wherein said server is a pay-per-view server wherein each time one of said descriptors is scheduled to be transmitted revenue is generated and an amount of said revenue is stored on said server.

20. The system as recited in claim 19 wherein said parameters include said revenue generated by descriptor.

21. A method of dynamically scheduling distribution of a plurality of information files, the method comprising:

generating a plurality of groups of descriptors, each group of said groups of descriptors corresponding to one of said information files;

determining a weighting value to each group of descriptors;

determining a viewing population number to a time segment of a time period when any of said plurality of information files can be distributed; and scheduling transmission of said information files so that one information file corresponding to said group of descriptors having a greatest weighting value is scheduled to be transmitted during said time segment having said greatest viewing population number.

22. The method as recited in claim 21 wherein scheduling comprises scheduling each of said information files to be transmitted during a plurality of segments, and the method further comprising updating said weighting value associated with each of said groups of descriptors so as to be inversely proportional to a number of segments during which said information file, to which said group of descriptors corresponds, is transmitted.

23. The method as recited in claim 21 wherein at least some of said plurality of information files are motion picture programs having video and audio information associated therewith and said groups of descriptors are predetermined parameters associated with one of said motion picture programs.

24. The method as recited in claim 23 wherein said predetermined parameters comprise revenue generated by said motion picture program during theatre play, a time of a previous segment when said motion picture program was scheduled for transmission, and a length of said motion picture program.

25. The method as recited in claim 21 wherein at least some of said plurality of information files are trailers for motion picture programs.

26. The method as recited in claim 21 wherein determining said weighting value comprises determining a plurality of weighting values each associated with a subgroup of said group of descriptors and said weighting value is determined based upon said plurality of weighting values.

27. A method of dynamically scheduling distribution of a plurality of information files in a plurality of time segments, the method comprising:

determining a weighting value corresponding to each information file of said plurality of information files;

determining a viewing population number corresponding to each time segment of said plurality of time segments; and scheduling transmission of at least some of said plurality information files based upon said weighting value and said viewing population number, so that information files corresponding to greater weighting values are scheduled for transmission during time segments corresponding to greater viewing population numbers.

28. The method as recited in claim 27 wherein said one information file comprises a motion picture.

29. The method as recited in claim 28 wherein determining said weighting value comprises determining said weighting value based upon parameters selected from a group consisting of film critic rankings, theater gross sales, number of available channels for transmission of said motion picture, a duration of said motion picture, a time when said motion picture was last transmitted on one said available channels, a contractual requirement with a licensor of said motion picture, predicted weather in a geographic area where said motion picture is to be distributed, and a time when said motion picture finished being played in theatres.

30. The method as recited in claim 27 wherein determining said weighing value comprises determining a plurality of weighing values each associated with a subgroup of a group of parameters and said weighing value is determined based upon said plurality of weighting values.

31. The method as recited in claim 27 wherein said one information file comprises one of a plurality of trailers for a motion picture.

32. The method as recited in claim 27 wherein determining said weighting value comprises determining said weighting value based upon parameters selected from a group consisting of film critic rankings, theater gross sales, number of available channels for transmission of said motion picture, a duration of said motion picture, a time when said motion picture was last transmitted on one said available channels, a contractual requirement with a licensor of said motion picture, predicted weather in a geographic area where said motion picture is to be distributed, and a time when said motion picture finished being played in theatres.

* * * * *